United States Patent Office 3,278,610
Patented Oct. 11, 1966

3,278,610
DIMERIZATION OF NAPHTHOLS
Walter A. Butte, Jr., West Chester, Pa., assignor to Sun Oil Company, Philadelphia, Pa., a corporation of New Jersey
No Drawing. Filed Apr. 19, 1963, Ser. No. 274,326
19 Claims. (Cl. 260—619)

This invention relates to the dimerization of 2-naphthol and certain alkyl derivatives thereof. The dimers, of which 1,1'-bi-2-naphthol is an example, are useful as fungicides, bactericides, and algaecides, and in the preparation of dyes, pharmaceuticals, and perfumes.

According to the invention 2-naphthol and certain alkyl derivatives thereof are dimerized by reacting same with oxygen in the presence of a cuprous salt and an amine of a type more fully defined hereinafter. The reaction which occurs, using 2-naphthol as an example of the starting material, is as follows (Equation 1):

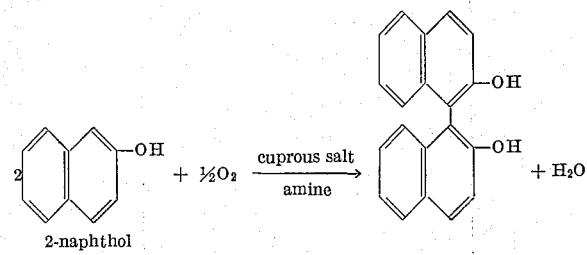

2-naphthol

It is apparent from Equation 1 that two molecules of the starting material are joined through a carbon-carbon linkage, and that the linkage occurs through the one position carbon atoms.

Although it is not known with certainity, it is believed that the effective agent which causes the dimerization is a three-component complex formed by interaction of the oxygen, cuprous salt, and amine. The reaction is somewhat sensitive and must be controlled in order to prevent the formation of tars and/or infusible solids in preference to the desired dimer. Such control is readily achieved by regulating the amount of oxygen consumed in the reaction.

In describing the invention the various types of each of the ingredients in the reaction, i.e., the starting material, amine, etc., will be described first, after which the various reaction conditions, i.e., temperature, amount of ingredients, etc., will be described.

The starting materials which can be dimerized by the method of the invention have the following structure:

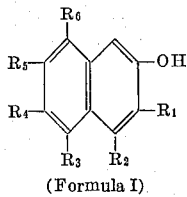

(Formula I)

wherein each of $R_1$–$R_6$ inclusive is hydrogen or an alkyl radical containing 1–4 carbon atoms. It is essential not only that the OH radical be in the two-position but also that the one-position be unsubstituted. Thus neither 1-naphthol nor 1-methyl-2-naphthol can be dimerized by the invention. Surprisingly, however, if the OH radical is in the two-position and the one-position is unsubstituted, the material will dimerize, even though alkyl substituents containing 1–4 carbon atoms are present at other positions.

Of the starting materials within Formula I certain ones are preferred for various reasons. As is apparent from Equation I the dimerization occurs through the one-position carbon atoms. In order to avoid steric hindrance problems it is preferred that the eight-position (Formula I above) be unsubstituted, i.e., that $R_6$ be hydrogen. In addition, because of economic and availability factors, it is preferred that not more than 2 of the remaining positions are substituted and that any substitutions are either methyl or ethyl. In summary, then, in Formula I above it is preferred that $R_6$ be hydrogen, that the remaining R's ($R_1$–$R_5$) be hydrogen or alkyl radicals containing 1–2 carbon atoms, and that the remaining R's be hydrogen in at least three instances.

The oxygen utilized in the reaction can be supplied as either oxygen per se, air, or hydrogen peroxide. Hydrogen peroxide is a suitable source because in the presence of the cuprous salt it decomposes to oxygen and water. All three of these suitable sources of oxygen are defined for the present purpose as oxygen. Where oxygen per se is the intended source, it will be so indicated, i.e., as oxygen per se. Preferably the source of oxygen is air or oxygen per se.

Any cuprous salts such as cuprous chloride, cuprous acetate, cuprous naphthenate, cuprous phosphate, cuprous ammonium acetate, cuprous sulfate, etc. are suitable for the present purpose. The particular salt employed is not critical, but it is important that the salt employed contain copper in cuprous rather than cupric form. Dimerization of the starting material does not occur when copper metal or a cupric salt is employed.

Although a variety of amines are suitable for the present purpose, they are of two basic types, aliphatic amines and heterocyclic amines. The latter are preferred.

The aliphatic amines suitable for the present purpose have the formula $R_3N$ or $R_2NH$, where R is an alkyl radical containing 1–10 carbon atoms and where there is a maximum of one tertiary carbon atom attached to the nitrogen atom. A tertiary carbon is a carbon atom which has three other carbon atoms attached to it. Irrespective of whether the aliphatic amine is a secondary ($R_2NH$) or a tertiary ($R_3N$) amine, the nitrogen atom of the amine should have not more than one tertiary carbon atom attached thereto. The reason for this requirement is that the nitrogen atom is the active portion of the amine in the formation of the aforesaid complex. If this nitrogen atom is surrounded by tertiary carbon atoms, steric hindrance prevents the complex from forming in any significant amount.

The heterocyclic amines suitable for the present purpose have several characteristics. As stated, they are heterocyclic, i.e., they contain a ring system having one or more atoms other than carbon as ring members. In addition, they are composed of only carbon, hydrogen, and nitrogen, consequently suitable heterocyclic amines contain a heterocyclic ring having only carbon and nitrogen atoms as ring members. The number of nitrogen atoms in the heterocyclic ring, i.e., the number of heterocyclic nitrogen atoms, should be 1–3 inclusive. Moreover, the heterocyclic ring itself must be of a certain type. It should be either a 5 or 6 membered ring and should contain 2 double bonds when the ring is 5 membered and 3 double bonds when the ring is 6 membered. A heterocyclic 5–6 membered ring containing 2–3 double bonds respectively and containing only carbon and 1–3 nitrogen atoms as ring members, will be referred to hereinafter as a ring which characterizes the heterocyclic amines of the invention, or, more briefly, as a characteristic heterocyclic ring. The characteristic heterocyclic rings as defined above can be shown structurally by the following two structures:

and

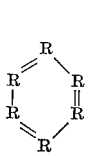

wherein R is nitrogen in 1–3 instances and is carbon in the remaining instances.

At least one of these characteristic heterocyclic rings is present in all heterocyclic amines suitable for the present purpose. As will be more fully described subsequently, the remaining valences in the structures as shown can be, with certain limitations, satisfied by hydrogen, alkyl radicals, aryl radicals, aralkyl radicals, alkaryl radicals, cycloalkyl radicals, radicals containing nitrogen such as aza-cycloalkyl, or nuclear carbon atoms or nuclear nitrogen atoms of a ring condensed with said characteristic ring. The manner in which the remaining valences are satisfied, however, is not a part of the above definition of a characteristic heterocyclic ring.

The simplest heterocyclic amines, from a structure standpoint, which meet the above characteristics of suitable heterocyclic amines, are as shown in Table I below. Each contains only carbon, hydrogen, and nitrogen. Each contains a ring which has one heterocyclic nitrogen atom and which is, in the case of pyrrole and the isopyrroles, a 5-membered ring having 2 double bonds and, in the case of pyridine, is a 6-membered ring having 3 double bonds. In other words, each contains a characteristic heterocyclic ring having one nitrogen atom. Furthermore, the remaining valences of the characteristic heterocyclic ring are satisfied by hydrogen and this is one method by which said valences are suitably satisfied. Moreover, in the specific examples listed there is only one ring, the characteristic heterocyclic ring.

*Table I*

| Name | Structure |
|---|---|
| Pyrrole | |
| Isopyrrole | |
| 3-isopyrrole | |
| Pyridine | |

Examples of other suitable heterocyclic amines containing only a single ring are shown in Table II below. These suitable heterocyclic amines contain a characteristic heterocyclic ring having more than one nitrogen atom. Moreover, the remaining valences of the characteristic heterocyclic ring are satisfied by hydrogen.

*Table II*

| Name | Structure |
|---|---|
| Pyrazole | |
| 3-isopyrazole | |
| Imidazole | |
| 2-isoimidazole | |
| Pyrazine | |
| Pyrimidine | |
| Pyridazine | |
| 1,2,3-triazole | |
| 1,2,4-triazole | |
| 4H-1,2,4-triazole | |
| 1,2,3-triazine | |
| 1,2,4-triazine | |
| 1,3,5-triazine | |

As stated above, the examples so far given of suitable heterocyclic amines contain only one ring. This is not essential, however, for as long as a characteristic heterocyclic ring is present, it can be condensed, at one or more points, with additional rings. The additional rings can be one or more monocyclic rings, such as in benzene, each condensed with the characteristic heterocyclic ring, can be one or more condensed ring systems, such as in naphthalene, one ring of the condensed ring system being condensed with the characteristic heterocyclic ring, or can be both. Examples of the former are quinoline and acridine (see Table III below) while examples of a condensed ring system condensed with a characteristic heterocyclic ring are 5,6-benzoquinoxaline (1,4-naphthisodiazine) and 1-aza-anthracene (6,7-benzoquinoline).

Table III

| Name | Structure |
|---|---|
| Quinoline | 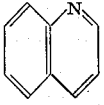 |
| Acridine | 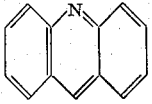 |
| 5,6-benzoquinoxaline | 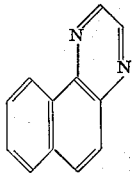 |
| 1-aza-anthracene | 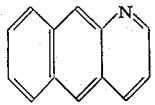 |

The additional rings can be hydrocarbon, either paraffinic, i.e., cycloalkyl, or aryl such as in benzene, naphthalene, cyclohexane, etc. or can be heterocyclic nitrogen rings in which case they should be either saturated rings, such as in piperidine (hexahydropyridine), 5-membered rings containing two double bonds, such as in pyrrole, or 6-membered rings containing 3 double bonds. Thus where an additional ring is a heterocyclic nitrogen ring it does not itself also have to be a characteristic heterocyclic ring, either with respect to the total number of nuclear atoms, the number of double bonds, or the number of nuclear nitrogen atoms. Examples of suitable heterocyclic amines in which a characteristic heterocyclic ring is condensed with a hydrocarbon ring are shown in Table IV below.

Table IV

| Name | Structure |
|---|---|
| Indole |  |
| Indolenine |  |
| Isoindolenine |  |
| Isoindazole |  |
| Isoquinoline | 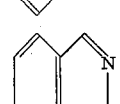 |

Table IV—Continued

| Name | Structure |
|---|---|
| Cinnoline | 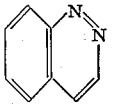 |
| Quinazoline | 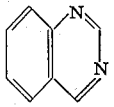 |
| Quinoxaline | 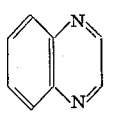 |
| Phenanthridine | 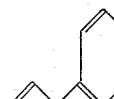 |
| Phenazine | 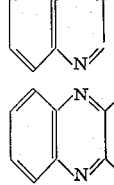 |

Examples of suitable heterocyclic amines in which a characteristic heterocyclic ring is condensed with a heterocyclic nitrogen ring are shown in Table V below.

Table V

| Name | Structure |
|---|---|
| Pyrrolo(3,2-b)pyrrole | 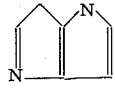 |
| s-Triazolo(1,5-a)pyrimidine |  |
| 7H-pyrrolo(2,3-b)pyridine | 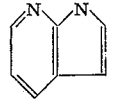 |
| Pyrido(2,3-b)pyridine | 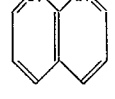 |

Examples of a suitable heterocyclic amine in which both a hydrocarbon ring and a nitrogen ring are condensed with a characteristic heterocyclic ring are shown in Table VI below.

Table VI

| Name | Structure |
|---|---|
| 9H-pyrido(2,3-b)indole | 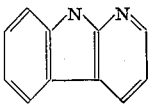 |
| Pyrido(3,2-b)quinoline | 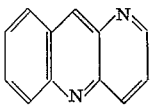 |

In the examples in which two heterocyclic nitrogen rings are present, each contains an uncondensed nitrogen atom. This is not essential, however, for a condensed nitrogen (or carbon) atom is considered a member of each ring.

An example of a suitable heterocyclic amine in which there are both a hydrocarbon ring and a heterocyclic nitrogen ring in addition to a characteristic heterocyclic nitrogen ring is 4,7-phenanthroline (Table VII below).

*Table VII*

| Name | Structure |
|---|---|
| 4,7-phenanthroline | 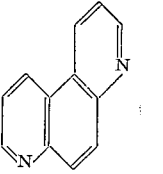 |

It was specified above that where the suitable heterocyclic amines contain a ring in addition to the characteristic heterocyclic ring, the former ring should be aryl or cycloalkyl when same is a hydrocarbon ring and should be, when same is a heterocyclic nitrogen ring, saturated, a 5-membered ring containing 2 double bonds, or a 6-membered ring containing 3 double bonds. The reason for this requirement is that olefinic type unsaturation should be avoided in the heterocyclic amines used in practicing the invention in order to avoid undesirable side reactions. Unsaturation per se is not objectionable; however, it must be present only as aromatic type unsaturation. Consequently, all unsaturation in the heterocyclic amines of the invention should be present only as a part of a ring sufficiently aromatic to avoid these side reactions. Such rings are 6-membered rings containing 3 double bonds, either aryl or heterocyclic nitrogen, or 5-membered heterocyclic nitrogen rings containing 2 double bonds.

It will be evident from the above discussion that with reference to the 2 aforesaid structures of characteristic heterocyclic rings the remaining valences of the structures can be satisfied by, in addition to hydrogen, nuclear carbon atoms or nuclear nitrogen atoms of rings condensed with said characteristic heterocyclic ring. This is also true for all rings present in the heterocyclic amines of the invention, i.e., all valences of nuclear atoms of a ring not satisfied by other nuclear atoms of the same ring can be satisfied by hydrogen, or by nuclear carbon and nitrogen atoms of a ring condensed therewith.

As described above, the characteristic heterocyclic ring can be condensed with a condensed ring system, such as in naphthalene, one ring of which is condensed with the characteristic heterocyclic ring. This does not, however, exclude the use of an uncondensed ring system, such as in biphenyl, one ring of which is condensed with the characteristic heterocyclic ring to give, for example, 8-phenylquinoline. However, this type of suitable heterocyclic amine is treated in this disclosure as a substituted heterocyclic amine, i.e., as a characteristic heterocyclic ring condensed with one additional ring and containing a substituent. Suitable substituents are described hereinafter.

With the exception of one limitation mentioned hereinafter the heterocyclic amines of the invention can also have one or more substituents attached to nuclear atoms. The substituents should contain not more than a total of 10 carbon and nitrogen atmos and should by previous definition contain only carbon, hydrogen, and nitrogen. Also by previous definition, the substituent should be free of olefinic type unsaturation. In addition, any nitrogen atoms in the substituent should be a nuclear nitrogen, i.e., a ring member. Examples of suitable substituents are radicals such as alkyl, aryl, aralkyl, alkaryl, cycloalkyl, aza-cycloalkyl, etc. Alkenyl radicals should be avoided because they tend to enter into undesirable side reactions in the presence of the cuprous salt utilized. The substituents can be present on the characteristic heterocyclic ring such as, for example, in 2-methylpyrrole, 2-methylquinoline, and 4,4'-bipyridine, (see Table VIII below) or can be attached to a ring which is not itself a characteristic heterocyclic ring but which is condensed with a characteristic heterocyclic ring such as, for example, 8-methylquinoline, or 5,6-dimethylindole, or can be attached to a ring which is neither a characteristic heterocyclic ring nor is condensed with one, such as in 8-methyl-1-aza-anthracene (Table VIII below). Still, subject to a limitation mentioned hereinafter, the substituent can be attached to either a nuclear carbon atom or a nuclear nitrogen atom, such as in, for example,2-methylpyridine or 1-methylisoindazole (Table VIII below).

*Table VIII*

| Name | Structure |
|---|---|
| 2-methylpyrrole | 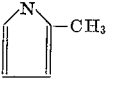 |
| 2-methylquinoline | 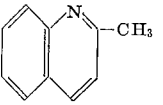 |
| 4,4'-bipyridine | 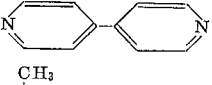 |
| 8-methylquinoline |  |
| 5,6-dimethylindole | 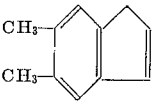 |
| 2-methylpyridine | 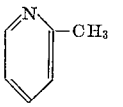 |
| 1-methylisoindazole | 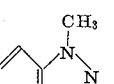 |
| 8-methyl-1-aza-anthracene | 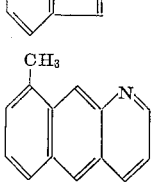 |

It will now be apparent that the remaining valences of the aforesaid 2 structures of characteristic heterocyclic rings can also be satisfied by the substituents specified above. Moreover, the valences of nuclear carbon and nitrogen atoms of all rings, not satisfied by other nuclear atoms of the same ring, can be satisfied by the above specified substituents.

A limitation on the number and size of the substituents arises where there is a substituent on the characteristic heterocyclic ring. There must be an unsubstituted nitrogen atom in the characteristic heterocyclic ring, an unsubstituted nitrogen atom in a characteristic ring being one whose valences are satisfied by either hydrogen, nuclear nitrogen or nuclear carbon of the characteristic heterocyclic ring, or nuclear carbon or nuclear nitrogen of a ring condensed therewith. Furthermore, this unsubstituted nitrogen atom should have an alpha nuclear atom, either carbon or nitrogen or both by previous definition, which is not substituted by substituents containing more than a total of 3 carbon and nitrogen atoms. In other words, the characteristic heterocyclic ring has an unsubstituted nitrogen atom and this atom itself has an alpha nuclear atom having attached thereto only hydrogen, nuclear carbon or nuclear nitrogen of the characteristic ring or of a ring condensed therewith, and radicals containing not more than 3 carbon and nitrogen atoms. Where a nuclear atom alpha to a nitrogen atom is common to two rings, i.e., where a nuclear alpha atom is a condensed atom, it is not considered for this reason alone to be substituted with a radical containing more than 3 carbon and nitrogen atoms. Thus 2-n-butylquinoline (Table IX below) is suitable for the present purpose. It should be recognized, however, that the characteristic heterocyclic ring need contain only one such unsubstituted nitrogen atom having an alpha nuclear atom as defined. Thus while 1-methpyrrole (Table IX below) is unsuitable because it has no unsubstituted heterocyclic nitrogen atom, 1-methylpyrazole (Table IX) is suitable because even though it has one substituted nitrogen atom, it also has one unsubstituted nitrogen atom and this latter atom has an alpha nuclear atom not substituted by a radical larger than $C_3$. Similarly, 2,5-di-n-butylpyrrole is unsuitable but 2,4-di-n-butyl-2-imidazole is suitable (see Table IX).

Table IX

| Name | Structure |
| --- | --- |
| 2-n-butylquinoline | |
| 1-methylpyrrole | |
| 1-methylpyrazole | |
| 2,5-di-n-butylpyrrole | |
| 2,4-di-n-butylimidazole | |

The above restrictions on the substituents are due to steric hindrance. The active portion of the amine in the formation of the complex is a nitrogen atom in a characteristic heterocyclic ring. If all nitrogen atoms in such a ring are substituted, or if their alpha nuclear atoms all contain large (more than 3 carbon and nitrogen atoms substituents, the formation of the complex is slow or non-existent.

Because of economic and availability factors certain of the suitable amines described above are more preferred than others. The preferred amines are pyrrole and its isomers, pyridine, quinoline and its isomer, and alkyl derivatives thereof wherein the alkyl radical contains 1-2 carbon atoms, wherein not more than 2 alkyl substituents are present, and wherein all alkyl substituents are attached to carbon atoms. These preferred amines can be indicated by the structures:

and

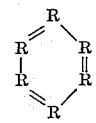

and

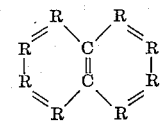

wherein R is nitrogen in 1 instance and is carbon in the remaining instances, and wherein the remaining valences are satisfied by hydrogen when R is nitrogen, and, when R is carbon, by a member selected from the group consisting of hydrogen and alkyl radicals containing 1-2 carbon atoms and where said alkyl radicals are present in a maximum of two instances.

Since pyridine has been found to give somewhat higher yields of dimer than the other suitable amines described above (both aliphatic and heterocyclic), pyridine is the most desirable amine to use in the practice of the invention.

Utilizing the above described components the invention is practiced in the following manner. In order to simplify the discussion it will be assumed that the starting material to be dimerized is 2-naphthol.

As described 2-naphthol is dimerized by reacting it with oxygen in the presence of a cuprous salt and an amine. The 2-naphthol and the amine should be in the liquid phase. In the case of an amine such as pyridine this is readily effected since pyridine has a low melting point ($-42°$ C.) and because 2-naphthol is soluble therein. In the case of an amine such as indazole which has a relatively high melting point ($142°$ C.) a solvent is desirably employed to render the 2-naphthol and amine liquid. Suitable solvents for this purpose include benzene, nitrobenzene, chlorobenzene, ether, hexane, heptane, nitrohexane, chlorohexane, nitroheptane, etc. The use of a solvent also provides an additional advantage in that it provides a vehicle for the reaction. A low melting amine such as pyridine serves as a vehicle equally well but such amines are usually more costly than the solvents mentioned. In the case of a low boiling amine such as dimethyl amine (B.P.$=7.4°$ C.) it can be maintained in liquid form by carrying out the reaction under pressure, at an appropriately low temperature, etc.

As described, the effective agent causing the dimerization of 2-naphthol is believed to be a complex formed from oxygen, the cuprous salt, and the amine. In the remainder of the description of the practice of the invention, the amine will be assumed to be pyridine. The complex can be preformed and the 2-naphthol subsequently mixed therewith or the 2-naphthol and pyridine can be mixed and the other components subsequently added thereto. The order in which the various components are mixed is not critical. However, as will be apparent hereinafter, the reaction is somewhat sensitive and care must be taken to prevent the reaction from going too far and producing a black tar or solid in preference to the desired dimer. The extent of reaction is most conveniently controlled by controlling the amount of oxygen consumed in the reaction. Consequently there are two preferred methods of practicing the invention. In one method the pyridine, 2-naphthol, and cuprous salt are mixed after which the oxygen is added in controlled amount. In the other method the cuprous salt and pyridine are mixed with a small amount of oxygen, the amount of oxygen being substantially less than the ultimate oxygen consumption desired. The 2-naphthol is then mixed in, followed by the addition of the remainder of the oxygen. In this latter method the initial mixture of the cuprous salt, pyridine, and oxygen is green, when the 2-naphthol is added the solution becomes orange, and as additional oxygen is added the mixture slowly changes color from orange to a light olive drab.

The amount of each component in the reaction can, with the exception of the amount of oxygen, vary over fairly wide limits. Again with the exception of oxygen, variations in the amount of each ingredient mainly influence the time required to effect formation of the dimer rather than the fact of dimer formation. In addition, variations in the amount of one ingredient can frequently be offset by a change in some other variable.

The amount of cuprous salt employed should normally be in the range of 0.0001–0.1 mol per mol of 2-naphthol, although lower or higher amounts can also be used. In Examples II and III hereinafter a two-fold increase in the amount of cuprous salt resulted in a 3–4 fold increase in reaction rate. Consequently, the amount of copper can be adjusted to provide the reaction rate desired. Generally, however, an amount of copper within the range specified above provides a steady, uniform reaction which produces the dimer in a reasonable length of time.

The amount of pyridine can also vary but since the aforesaid complex is believed to contain 4 mols of pyridine per mol of copper, it is desirable to use at least this amount of pyridine in order to make the most efficient use of the cuprous salt present. Preferably an excess of pyridine is used, say, 4–500 mols per mol of cuprous salt.

In order to obtain dimers of the starting material the amount of oxygen consumed should be limited to approximately the theoretical amount required for dimer formation. It is apparent from Equation I that dimerization of 1 mol of 2-naphthol requires 0.25 mol oxygen. Consequently the amount of oxygen employed should not be greater than 0.25 mol oxygen per mol of 2-naphthol. When larger amounts are used the reaction product is a black tar or solid which has a substantially higher oxygen content than the oxygen content of the dimer. This indicates that use of excess oxygen results in a completely different product. Preferably the amount of oxygen employed is limited to not more than 90% of theoretical, i.e., 0.225 mol per mol of 2-naphthol. Within these maximum limits the amount of oxygen can be varied considerably. However, in order to obtain a significant yield of dimer product the amount of oxygen used should at least be 30% of theoretical, i.e., 0.075 mol per mol of 2-naphthol, and is preferably 50% of theoretical, i.e., 0.125 mol per mol of 2-naphthol.

The reaction is preferably carried out at about room temperature although higher temperatures of, say, 150° C. or lower temperatures of, say, −10° C. can also be used. The main influence of temperature is upon the reaction rate and the temperature can be varied to obtain the rate desired. The temperature can also be varied to offset changes in other variables such as the amount of cuprous salt present. Thus the reduction in reaction rate normally occasioned by a reduction in the amount of cuprous salt can be avoided by an equivalent increase in reaction temperature.

The reaction can be carried out under any convenient pressure although a pressure equal to or higher than atmospheric is normally preferred in order to prevent the escape of oxygen from the reaction medium, i.e., from the mixture of pyridine, 2-naphthol, and cuprous salt. This aspect will be more fully discussed hereinafter.

The reaction time required for the formation of the dimer will vary depending upon such factors as the amount of cuprous salt present, the reaction temperature, the rate at which oxygen is supplied, etc. but will normally be in the range of 0.1–10.0 hours, more frequently in the range of 1–3 hours.

The reaction can be carried out in conventional equipment. By way of example the pyridine is added to a closed mixing tank equipped with an agitator. The 2-naphthol is then added and the mixture stirred until the 2-naphthol dissolves. The cuprous salt is then added and the mixture is again stirred. Finally the oxygen is added by any of several techniques. One convenient technique is to merely bubble oxygen into the pyridine-cuprous salt-2-naphthol mixture through the bottom of the tank. A meter in the oxygen delivery line provides knowledge of the amount of oxygen added and the fact that the mixing tank is closed insures that no oxygen escapes from the reaction zone. Thus controlled addition of oxygen is readily obtained. As the oxygen is added it is desirable to stir the contents of the tank in order to insure uniform composition of the reaction medium.

Another method of carrying out the reaction and which involves a slightly different method of adding oxygen to the reaction medium involves adding the pyridine and cuprous salt to a mixing tank which is maintained at, say, atmospheric pressure, and which is connected to an oxygen supply vessel. A meter is provided in said connection in order to measure the flow of oxygen from the supply vessel to the mixing tank. A relatively small amount of oxygen is admitted to the mixing tank above the surface of the pyridine and the contents of the tank are stirred rather vigorously in order to inject the oxygen into the reaction liquid. The 2-naphthol is then added and stirred to obtain dissolution thereof. Finally additional oxygen is admitted to the mixing tank while continuing the agitation. When the meter indicates that the proper amount of oxygen has been added the oxygen feed is shut off. At this point, i.e., when the reaction is complete, it will usually be found that there is a small amount of oxygen in the vapor space above the reaction liquid, i.e., not all of the oxygen admitted to the tank actually dissolves in the reaction liquid and enters into the dimerization reaction. If desired, this unconsumed oxygen can be measured and a correction applied therefor. However, in most cases the amount of this oxygen is negligible compared to the total amount of oxygen admitted and can be neglected.

When the reaction is complete it is normally desirable to add a small amount of hydrochloric acid to the reaction liquid to insure that the reaction is stopped and thus minimize by-product formation. The hydrochloric acid converts the copper from the cuprous form to the cupric form, the latter form being inactive under the reaction conditions employed. The acid also converts, if used in large enough quantities, the pyridine to pyridine hydrochloride, the latter compound also being ineffective for the present purpose.

The reaction product mixture consists of some unreacted 2-naphthol, the 1,1'-bi-2-naphthol product, some by products, water, pyridine, and, where the reaction product was quenched with acid, cupric salt. The unreacted 2-naphthol, most of the by-products, and the 1,1'-bi-2-naphthol can be extracted, in the form of their sodium salts, with sodium hydroxide. The sodium hydroxide also converts the cupric salt to insoluble cupric hydroxide. Some cupric hydroxide will normally be found suspended in the extract phase and can be removed by filtration, while some will normally be in the remaining pyridine phase and this cupric hydroxide can also be separated by filtration in order to separate pyridine. If a solvent such as benzene was employed the pyridine will be recovered in admixture with the solvent. Separation of the pyridine from the solvent can be effected by distillation, water extraction, etc. The unreacted 2-naphthol, the dimer product, and some by-products are precipitated from the alkaline extract by acidifying the latter. From this precipitate the dimer product is separated by fractional crystallization from benzene, a benzene-hexane mixture, etc. at about room temperature or by extraction of the 2-naphthol and by-products with hot water.

The following examples illustrate the invention more specifically. In all the examples the apparatus utilized consisted of a glass reaction flask which was closed to the atmosphere and which was equipped with a motor driven agitator. Adjacent the flask was another flask fitted to the top of one leg of a U-tube. This flask contained oxygen and the U-tube contained mercury. Since the remaining leg of the U-tube was open to the atmosphere the oxygen contained in the flask was at atmospheric pressure. The flask containing oxygen was connected to the top of the reaction flask by means of a glass pipe containing a valve (oxygen supply valve) therein. The U-tube was calibrated, consequently when the mercury level in the U-tube changed because oxygen was removed from the oxygen flask, the volume of oxygen removed could be determined by the change in mercury level.

EXAMPLE I

This example shows, inter alia, the deleterious effect of an excess of oxygen. The quantities stated as mols are gram-mols. The reaction was carried out at room temperature.

The reaction flask was evacuated and then charged with 20 mg. cuprous chloride (0.0002 mol), 50 ml. of benzene (solvent), and 4.91 gms. pyridine (0.062 mol). The mixture was stirred until uniform. The agitator was shut off and the oxygen supply valve opened to provide an oxygen atmosphere in the reaction flask at atmospheric pressure. The mercury level in the U-tube at this point was noted and identified as the level at time zero. Subsequent mercury level readings were obtained with the agitator shut off and the flask at atmospheric oxygen pressure, the agitator being shut off in order to avoid oxygen dissolution during the few seconds it took to take the reading.

The agitator was started again and after 5 minutes the oxygen uptake, as determined from mercury levels, was 5 ml. (at 0° C. and 760 ml.). At this point 2.88 gms. (0.02 mol) of 2-naphthol was added to the reaction flask. Thus the mol ratio of cuprous salt to 2-naphthol was 0.01:1. The mol ratio of pyridine to cuprous salt was 310:1.

After addition of the 2-naphthol stirring was continued with the oxygen valve open to allow steady consumption of oxygen. Mercury level readings were taken periodically and oxygen consumption determined therefrom. The data in Table X show the oxygen uptake at various reaction times. The reaction temperature was 25° C.

*Table X*

Reaction time (hrs.): Oxygen uptake (mls. at 0° C. and 760 mm.)

| Reaction time (hrs.) | Oxygen uptake (mls. at 0° C. and 760 mm.) |
|---|---|
| 0 | 0 |
| 0.25 | 5 |
| 1.25 | 26 |
| 2.25 | 44 |
| 3.25 | 63 |
| 4.25 | 75 |
| 6.75 | 95 |
| 8.75 | 112 |
| 22.25 | 195 |

The theoretical oxygen uptake for dimerization (see Equation I) is 112 ml. (at 0° C. and 760 mm. Hg). At this uptake, and thereafter to 195 ml., substantially the only product produced was a black unfusible solid. Not even any unreacted 2-naphthol could be recovered.

EXAMPLE II

The procedure was the same as in Example I except that the amount of cuprous chloride was 40 mg. (0.0004 mol) and the oxygen feed rate was lower. The mol ratio of cuprous salt to 2-naphthol thus was 0.02:1 and the mol ratio of pyridine to cuprous salt was 155:1. The oxygen uptake at various times was as shown in Table XI.

*Table XI*

Reaction time (min.):

| Reaction time (min.) | Oxygen uptake (mls. at 0° C. and 760 mm.) |
|---|---|
| 0 | 0 |
| 15 | 5 |
| 25 | 21 |
| 35 | 36 |
| 45 | 49 |
| 55 | 58 |
| 65 | 66 |
| 75 | 75 |
| 95 | 84 |
| 105 | 86 |

At a reaction time of 105 min. the reaction mixture was quenched in 100 ml. of 1 N HCl. Unreacted 2-naphthol, 1,1'-bi-2-naphthol, and some by-products were separted by NaOH extraction. The extract was filtered and acidified with HCl. From the resulting precipitate 1,1'-bi-2-naphthol was separated by fractional crystallization from benzene at room temperature. Next unreacted 2-naphthol was separated by another fractional crystallization.

The unreacted 2-naphthol was 65% by weight of the 2-naphthol originally charged to the reaction flask, i.e, the recovery was 65%. The yield of 1,1'-bi-2-naphthol was 50% by weight of reacted 2-naphthol. The amount of oxygen consumed (86 ml.) was 77% of the theoretical amount (112 ml.) required for dimerization of 2-naphthol.

EXAMPLE III

The procedure was the same as in Example II, except that the amount of 2-naphthol was 7.2 gms. (0.05 mol) the amount of cuprous chloride was 200 mg. (0.002 mol), the amount of benzene was 150 ml., the amount of pyridine was 12.3 gms. (0.155 mol), and the oxygen feed rate was different. Thus the mol ratio of cuprous salt to 2-naphthol was 0.04:1, and the mol ratio of pyridine to cuprous salt was 77:1. The oxygen consumption at various reaction times was as indicated in Table XII below.

*Table XII*

Reaction time (min.):

| Reaction time (min.) | Oxygen uptake (mls. at 0° C. and 760 mm.) |
|---|---|
| 0 | 0 |
| 15 | 7½ |
| 20 | 66½ |
| 25 | 97½ |
| 30 | 125½ |
| 35 | 144½ |
| 39 | 157½ |

At a reaction time of 39 minutes the reaction mixture was quenched in 100 ml. of 1 N HCl. Unreacted 2-naphthol and 1,1'-bi-2-naphthol were separated by the same procedure as in Example II. The amount of unreacted 2-naphthol recovered was 57% by weight of 2-naphthol originally charged to the reaction flask. The yield of 1,1'-bi-2-naphthol was 44% by weight of the reacted 2-naphthol. The amount of oxygen consumed was 57% of the theoretical amount required for dimerization.

EXAMPLE IV

The procedure was the same as in Example II except that the starting material was 1-naphthol instead of 2-naphthol. At an oxygen consumption of approximately 75% of theoretical the only product obtained was a black infusible solid. No unreacted 1-naphthol could be recovered.

Substantially analogous results as obtained in Examples II and III are obtained when other starting materials, amines, cuprous salts, etc. as described herein are used. Substantially analogous results are also obtained when other reaction conditions as described herein as suitable are used.

The invention claimed is:
1. Method of preparing dimers of 2-naphthol and dimers of alkyl substituted 2-naphthols which comprises reacting a compound which is in liquid phase and which has a structure as follows:

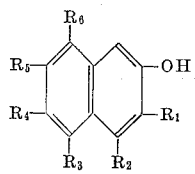

wherein $R_1$–$R_6$ are selected from the group consisting of hydrogen and alkyl radicals containing 1–4 carbon atoms with 0.075–0.25 mol oxygen per mol of said compound in the presence of an amine and a cuprous salt, said amine being in liquid phase and being selected from the group consisting of (1) aliphatic amines selected from the group consisting of $R_3N$ and $R_2NH$ wherein R is an alkyl radical containing 1–10 carbon atoms and wherein a maximum of 1 carbon atom attached to the nitrogen atom is a tertiary carbon atom, and (2) heterocyclic amines characterized in that
  (A) they contain only carbon, hydrogen, and nitrogen,
  (B) all nitrogen atoms are members of a ring,
  (C) they contain a ring selected from the group consisting of

and

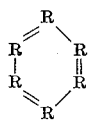

wherein
  (a) R is nitrogen in 1–3 instances and is carbon in the remaining instances,
  (b) at least one nitrogen is unsubstituted and has an alpha nuclear atom which has attached thereto only hydrogen, nuclear carbon and nuclear nitrogen of said ring, nuclear carbon and nuclear nitrogen of a ring condensed with said ring, and substituents in which the total number of carbon and nitrogen atoms is 1–3,
  (D) all double bonds exist only as parts of a 5-membered heterocyclic ring containing 2 double bonds and 6-membered rings containing 3 double bonds,
  (E) all valences of nuclear atoms of a ring not satisfied by other nuclear atoms of the same ring are satisfied by a member selected from the group consisting of hydrogen, substituents in which the total number of carbon and nitrogen atoms is 1–10, and nuclear carbon and nuclear nitrogen of another ring condensed therewith.

2. Method according to claim 1 wherein the amount of cuprous salt is in the range of 0.0001–0.1 mol per mol of said compound.

3. Method according to claim 1 wherein the amount of said amine in liquid phase is in the range of 4–500 mols per mol of said cuprous salt.

4. Method according to claim 1 wherein said amine in liquid phase is a heterocyclic amine.

5. Method according to claim 4 wherein said amine in liquid phase is pyridine.

6. Method according to claim 1 wherein said compound is 2-naphthol.

7. Method according to claim 1 wherein the source of said oxygen is selected from the group consisting of air and oxygen per se.

8. Method according to claim 1 wherein the amount of oxygen is in the range of 0.125 to 0.225 mol per mol of said compound.

9. Method of preparing dimers of 2-naphthol and dimers of alkyl derivatives of 2-naphthol which comprises reacting a compound which is in liquid phase and which has a structure as follows:

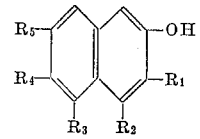

wherein $R_1$–$R_5$ are selected from the group consisting of hydrogen and alkyl radicals containing 1–2 carbon atoms and wherein R is hydrogen in at least 3 instances with 0.075–0.25 mol of oxygen per mol of said compound in the presence of at least 0.0001 mol of a cuprous salt per mol of said compound and in the presence of 4–500 mols per mol of said cuprous salt of a heterocyclic amine which is in liquid phase and which is selected from the group consisting of

and

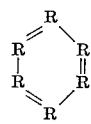

and

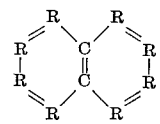

wherein R is nitrogen in one instance and is carbon in the remaining instances and wherein the remaining valences are satisfied by hydrogen in the case of nitrogen atoms and by hydrogen and alkyl radicals containing 1–2 carbon atoms in the case of carbon atoms, the total number of said alkyl radicals being less than 3.

10. Method according to claim 9 wherein said heterocyclic amine is pyridine.

11. Method according to claim 9 wherein said compound is 2-naphthol.,

12. Method according to claim 9 wherein the amount of cuprous salt is in the range of 0.0001 to 0.1 mol per mol of said compound.

13. Method according to claim 9 wherein all remaining valences are satisfied by hydrogen.

14. Method according to claim 9 wherein the amount of oxygen is in the range of 0.125 to 0.225 mol per mol of said compound.

15. Method of preparing 1,1'-bi-2-naphthol which comprises reacting 2-naphthol with oxygen in the presence of a cuprous salt in the presence of pyridine, the amount of oxygen being in the range of 0.075 to 0.25 mol per mol of 2-naphthol, said 2-naphthol and said pyridine being in liquid phase.

16. Method according to claim 15 wherein the amount of cuprous salt is in the range of 0.0001 to 0.1 mol per mol of 2-naphthol.

17. Method according to claim 15 wherein the amount of pyridine is in the range of 4–500 mols per mol of said cuprous salt.

18. Method according to claim 15 wherein the amount of oxygen is in the range of 0.125 to 0.225 mol per mol of 2-naphthol.

19. Method according to claim 15 wherein the source of oxygen is selected from the group consisting of oxygen per se and air.

No references cited.

LEON ZITVER, *Primary Examiner.*

D. M. HELFER, *Assistant Examiner.*